United States Patent Office

2,783,150
Patented Feb. 26, 1957

2,783,150

TREATMENT OF FLOUR WITH GLUCOSE OXIDASE

Herbert G. Luther, Baldwin, N. Y., assignor to Chas. Pfizer & Co., Inc., New York, N. Y., a corporation of Delaware No Drawing. Application September 25, 1952, Serial No. 311,527

3 Claims. (Cl. 99—93)

This invention is concerned with baking compositions. In particular, it is concerned with flours which show considerably improved dough formation qualities.

A variety of agents are used to improve the quality of flour in a rapid manner so as to duplicate or improve upon the change in dough formation qualities which are normally achieved only by naturally aging the flour for some months. Some of these materials also have the quality of bleaching the flour rapidly. Agents of this nature include nitrogen trichloride, chlorine dioxide, benzoyl peroxide, ascorbic acid, bromates and so forth. These flour improvers are used alone or in combination with one another to achieve the rapid aging and conditioning of flours. The improvement of flours which are achieved by these agents may be measured by the dough handling qualities of the product and by improvement in the gluten strength of the dough formed from the treated flour. Various apparatus have been devised to evaluate these properties, but one skilled in this art can often evaluate a given material without resorting to special apparatus. The general effect of improving flour and baking composition qualities is often known as maturing. The farinograph and extensograph are apparatus that have been used to evaluate this improved quality which is highly desirable in flours.

It has been found that the addition of a very minor proportion of an enzyme product generally known as glucose oxidase has a very marked maturing effect upon flours and various baking compositions. Glucose oxidase is available commercially, generally as a solution but sometimes in the form of a powder. This commercial material, which is usually prepared from products formed in the growth of certain microorganisms on nutrient media, normally contains a mixture of enzymes; not only a major proportion of glucose oxidase but also a minor amount of such enzymes as catalase. In fact it is quite difficult to separate completely the catalase from glucose oxidase in such preparations.

Enzyme preparations which are quite suitable for use in the compositions of this invention may be prepared by the growth of certain fungi and molds. This is particularly true of products formed by certain Aspergilli, particularly *Aspergillus niger*. If a gluconic acid-producing strain of *Aspergillus niger* is grown in a sugar-containing medium with adjustment of the pH in a range of from slightly acid to neutral during the fermentation, there is produced a metallic gluconate such as the potassium, ammonium, or calcium salt. The mycelium which is formed contains a particularly high proportion of the enzymes required for the present compositions. The enzymes may be recovered in a suitable form by extraction of the mycelium. This is most favorably accomplished by disintegration of the filtered mycelium; for instance, by homogenization or by any other process which breaks the cell walls of the mycelium without inactivating the enzymes. The enzyme preparation may then be extracted into water and the cell residues may be removed by filtration or centrifugation. The aqueous solution of enzymes that is obtained may be used directly or, more desirably, the product may be dried. For instance, the addition of a non-solvent for the enzymes, such as acetone, to the aqueous solution results in the precipitation of a solid product which may be dried. Alternatively, the whole solution may be dried under carefully controlled conditions; for instance, from the frozen state under vacuum. Care must be taken that the enzyme preparations are not exposed to elevated temperatures for prolonged periods or the materials will be partially or completely inactivated. Various other organisms, such as *Penicillium notatum* Westling, *Penicillium resticulosum* and *Penicillium corylophylum*, may be used for the preparation of suitable enzyme materials. It should be noted that the enzyme preparations, which we have designated glucose oxidase, have been known by other terms. For instance, at one time this material was erroneously considered to be an antibiotic and was designated as Notatin, Penatin, Penicillin A or Penicillin B, and by other terms. Essentially, the enzyme catalyzes the oxidation of glucose to gluconic acid with formation of hydrogen peroxide. If catalase is present, the peroxide decomposes to oxygen and water.

The activity of the enzyme materials used in the preparation of compositions of this invention may be measured by several different procedures. One such procedure is by use of a Warburgh manometer in which the uptake of oxygen is measured during a standard period while the enzyme preparation acts on a glucose substrate. Other methods, such as the activity of the material in an antibiotic-type serial dilution assay using *Staphylococcus aureus* as the standard organism and determination by means of such dyes as phenol indophenol may also be used. Natural enzyme preparations made from various organisms and under different conditions will vary somewhat in their activity. If the *Staphylococcus aureus* assay method is used as a standard, enzyme preparations may have as high as about 50,000 units per milligram. However, appreciably higher potency material may be prepared by purifying the commercial product. If desired, the active enzyme preparation may be diluted with starch, or with other suitable, non-toxic, edible materials before incorporation into the baking preparations of this invention.

In general, at least about one part by weight of the crude glucose oxidase enzyme preparation, as recovered in dry form from one of the fermentation procedures, is used per 500,000 parts by weight of flour or other baking composition. Appreciably higher proportions of the material may be used with no deleterious effect and with an increased effectiveness made in the quality of the flour or baking preparation which is treated. However, there is little practical object in using more than about one part by weight of the glucose oxidase per thousand parts by weight of the flour or other baking preparation. The materials may be mixed by equipment standard in the milling industry. Blending of the enzyme preparation into the flour should be thorough in order that treatment may be uniform. After the mixture has been prepared, it may be allowed to stand for a short time, for example, two or three days at room temperature or it may be immediately packaged. The improvement in the quality of the treated material is always evident when the flour is incorporated with water or other liquid in the preparation of a baked product. When treated and untreated flour is made into dough, the treated material may be readily distinguished because of its increased dough strength, improved handling qualities and the improved texture and appearance of the baked products prepared from the dough.

The glucose oxidase preparations may be used alone in the treatment of flour or other baking materials as indicated above, or they may be incorporated with other materials which are normally used for treatment of flours. For instance, the use of glucose oxidase, together with ascorbic acid, accomplishes appreciable improvement in the dough forming and baking qualities of a flour. Other materials such as nitrogen trichloride, chlorine dioxide, bromates, and benzoyl peroxide may be used in addition to the glucose oxidase. The use of ascorbic acid with glucose oxidase preparations in the treatment of flour is particularly effective. The former may be incorporated at a level in the order of about one part by weight per 500,000 parts by weight of flour.

Various types of flour are improved in quality by the incorporation therein of a very small proportion of glucose oxidase. These include wheat, rice, potato, and so forth, but it is with wheat flour that the most marked and most favorable improvement is obtained. The degree of improvement will vary somewhat with the type of wheat flour used, that is, whether it is a patent flour or one less highly refined, but, in general, there is a definite improvement with any type of flour. The enzyme preparations may be added if desired to baking mixtures such as cake mixes, waffle mixes, pie crust mixes, roll baking preparations and so forth which are marketed to be mixed with liquids just before baking. However, it is generally easier to incorporate the agent at the mill with the desired flour stream and to thoroughly blend the mixture before packaging or preparing various products. Rather than incorporating a glucose oxidase preparation in flour, it may be mixed with the various other ingredients at the time of preparation of dough. This procedure is useful since it permits of storage of a lesser number of flours at the bakery. The use of the glucose oxidase preparations is particularly advantageous when bread or rolls are being prepared.

The following example is given by way of illustration only and is not to be considered as the sole embodiment of this invention. It is to be understood that protection hereof is only to be limited by the specific wording of the appended claims.

*Example*

Ten pounds of wheat bread was divided into two equal portions. One of these was mixed thoroughly with 40 milligrams of a glucose oxidase preparation having about 25,000 *S. aureus* units per milligram activity. After a week during which the two portions of flour were stored under identical conditions, bread was prepared from each using the usual ingredients and procedure. It was found that the dough prepared from the treated flour handled a great deal easier, and the bread that was produced therefrom was more uniform in texture and of a higher general quality.

What is claimed is:

1. A process for the improvement of wheat flour which comprises mixing with the wheat flour at least one part by weight of a glucose oxidase enzyme preparation, having between about 25,000 and 50,000 *S. aureus* units per milligram activity, per 500,000 parts by weight of the wheat flour.

2. A flour of improved dough-forming quality, which comprises flour containing at least about one part by weight of a glucose oxidase enzyme preparation, having between about 25,000 and 50,000 *S. aureus* units per milligram activity, in 500,000 parts by weight of flour.

3. A flour of improved dough-forming quality, which comprises wheat flour together with at least about one part by weight of a glucose oxidase enzyme preparation, having between about 25,000 and 50,000 *S. aureus* units per milligram activity, in 500,000 parts by weight of wheat flour.

References Cited in the file of this patent

UNITED STATES PATENTS

| Re. 23,523 | Baker | July 22, 1952 |
| 2,149,682 | Jorgensen | Mar. 7, 1939 |
| 2,262,138 | Frey | Nov. 11, 1941 |

FOREIGN PATENTS

| 207,225 | Great Britain | of 1923 |

OTHER REFERENCES

"The Enzymes," vol. 2, Pt. 1, 1951, by J. B. Sumner and Karl Myrback; published by Academic Press Inc. (New York), page 764.